United States Patent
Yamauchi

(10) Patent No.: US 6,898,606 B2
(45) Date of Patent: May 24, 2005

(54) EVENT DATA PROCESSING METHOD AND APPARATUS

(75) Inventor: Kenji Yamauchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 444 days.

(21) Appl. No.: 10/238,962

(22) Filed: Sep. 11, 2002

(65) Prior Publication Data

US 2003/0204643 A1 Oct. 30, 2003

(30) Foreign Application Priority Data

Apr. 30, 2002 (JP) .......................................... 2002-128138

(51) Int. Cl.⁷ .............................................. G06F 17/30
(52) U.S. Cl. ........................ 707/101; 707/102; 707/103; 707/104
(58) Field of Search ............................ 707/3, 10, 101, 707/102, 103, 104

(56) References Cited

U.S. PATENT DOCUMENTS

| | | | | |
|---|---|---|---|---|
| 5,963,933 A | * | 10/1999 | Cheng et al. ................... | 707/2 |
| 6,662,175 B1 | * | 12/2003 | Ghazal et al. ................... | 707/2 |
| 2002/0198872 A1 | * | 12/2002 | MacNicol et al. .............. | 707/3 |

FOREIGN PATENT DOCUMENTS

| | | |
|---|---|---|
| JP | 2000-242496 | 9/2000 |
| WO | WO 01/63480 A2 * | 8/2001 |

* cited by examiner

*Primary Examiner*—Thuy N. Pardo
(74) *Attorney, Agent, or Firm*—Leydig, Voit & Mayer, Ltd.

(57) ABSTRACT

A method and an apparatus for event data processing with which modification of a program and database is not required even when a message format is changed, thereby making it easy to perform a maintenance operation. An event data processing method for editing and saving a message in accordance with a request from a function program includes: message editing utilizing a JOIN function of a function database that uses a relational database of the function program; obtaining information for saving the message by referring to an information table in accordance with a saving request from the function program; and saving the message into a saving area on the basis of the obtained information.

9 Claims, 4 Drawing Sheets

FIG. 2

| TABLE NAME | MESSAGE TABLE |
|---|---|
| COLUMN NAME | MESSAGE |
| DATA DEFINITION | "ERROR : MEASURED VALUE EXCEED HIGH LIMIT %f" |
| ASSIGNMENT EXPRESSION | MEASURED VALUE. HIGH LIMIT VALUE |

FIG. 3

| TABLE NAME | MESSAGE TABLE |
|---|---|
| COLUMN NAME | MESSAGE |
| DATA DEFINITION | "ERROR : MEASURED VALUE EXCEED HIGH LIMIT %f" |
| ASSIGNMENT EXPRESSION | $MVA = \sqrt{MW^2 + MVar^2}$<br>NOTE :<br>MW=MW MEASURED VALUE. HIGH LIMIT VALUE<br>Mvar=Mvar MEASURED VALUE. HIGH LIMIT VALUE |

FIG. 4

| TABLE NAME | MESSAGE TABLE |
|---|---|
| COLUMN NAME | MESSAGE |
| DATA DEFINITION | "ERROR : MEASURED VALUE EXCEED HIGH LIMIT %f" |
| ASSIGNMENT EXPRESSION 1 | IF(MEASURED VALUE. MEASURED VALUE>MEASURED VALUE. HIGH LIMITVALUE)THEN "HIGH LIMIT"<br>ELSE IF(MEASURED VALUE. MEASURED VALUE<MEASURED VALUE. LOWLIMIT VALUE)THEN "LOW LIMIT"<br>ENDIF |
| ASSIGNMENT EXPRESSION 2 | IF(MEASURED VALUE. MEASURED VALUE>MEASURED VALUE. HIGH LIMIT VALUE)THEN MEASURED VALUE. HIGH LIMIT<br>ELSE IF(MEASURED VALUE. MEASURED VALUE<MEASURED VALUE. LOW LIMIT VALUE)THEN MEASURED VALUE. LOW LIMIT<br>ENDIF |

FIG. 5

| TABLE NAME | MESSAGE TABLE |
|---|---|
| COLUMN NAME | MESSAGE |
| DATA DEFINITION | IF(MEASURED VALUE. FORMAT TYPE==1)THEN<br>   "ERROR : MEASURED VALUE EXCEED HIGH LIMIT %f"<br>ELSE IF(MEASURED VALUE. FORMAT TYPE==2)THEN<br>   "ERROR : LIMIT VIOLATION : HIGH LIMIT %f"<br>ENDIF |
| ASSIGNMENT EXPRESSION | MEASURED VALUE. HIGH LIMIT VALUE |

FIG. 6

| MESSAGE 1 | ATTRIBUTE 1.1 | ATTRIBUTE 1.2 | ATTRIBUTE 1.3 |
|---|---|---|---|
| MESSAGE 2 | ATTRIBUTE 2.1 | ATTRIBUTE 2.2 | ATTRIBUTE 2.3 |
| ⋮ | ⋮ | ⋮ | ⋮ |
| MESSAGE n-1 | ATTRIBUTE n-1.1 | ATTRIBUTE n-1.2 | ATTRIBUTE n-1.3 |
| MESSAGE n | ATTRIBUTE n.1 | ATTRIBUTE n.2 | ATTRIBUTE n.3 |

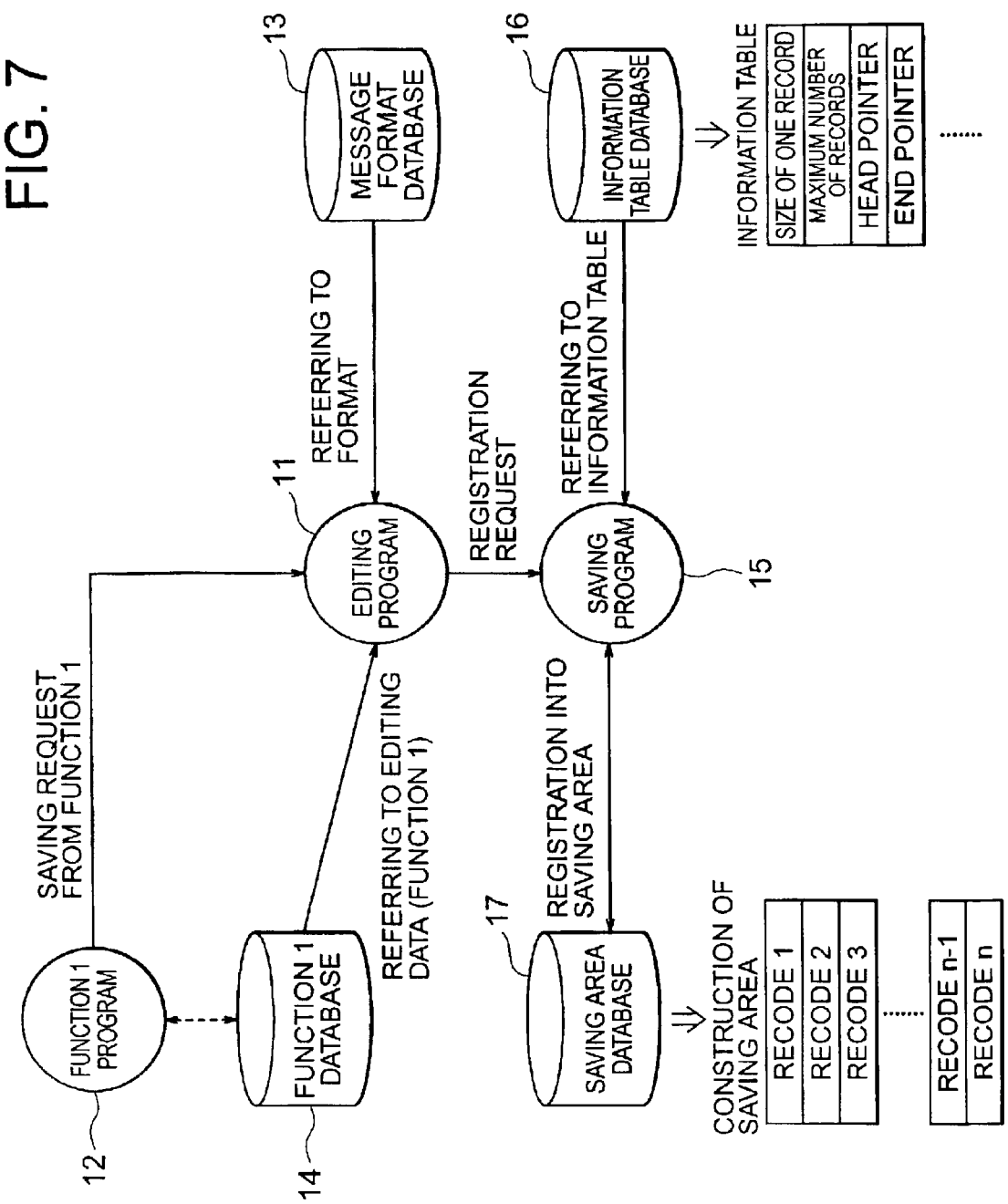

EVENT DATA PROCESSING METHOD AND APPARATUS

BACKGROUND OF THE INVENTION

1. Field of the Invention

The present invention relates to a method and an apparatus for event data processing used in a distributed electric power system monitoring and controlling system or the like.

2. Description of the Related Art

FIG. 7 shows a conventional event data processing method of this type that is described, for instance, in JP 2000-242496 A. In FIG. 7, an editing program 11 receives a request to edit a message from a program 12 of a function 1. On receiving this message editing request, the editing program 11 obtains information necessary for editing by referring to a format in a message format database 13. The obtained information concerns an arrangement, contents to be arranged, and the like. Note that the editing program 11 is activated by a computer (not shown) in which there exists data necessary for a message to be edited. In accordance with the message editing request, the editing program 11 performs the editing of a message by referring to editing data in a database 14 of the function 1. After this message editing, the editing program 11 sends a registration request to a saving program 15.

On receiving the registration request, the saving program 15 refers to an information table (to be described later) of an information table database 16 and obtains information to be saved. On the basis of the obtained information, the saving program 15 performs the registration into the nth record of a saving area database 17. The information table is composed of information concerning: the size of one record; the maximum number of records; a head pointer; an end pointer; and the like.

The conventional event data processing method is constructed in the manner described above and the editing of a message is performed by the editing program, so that it is required to modify the editing program when a new message is added. This causes a problem in that a maintenance operation is time-consuming. Also, a message format is saved in a database, so that it is required to change the message format and to perform the maintenance of the database when a message is added.

SUMMARY OF THE INVENTION

The present invention has been made to solve the problems described above and an object thereof is to provide a method and apparatus for event data processing with which modification of a program and database is not required even when a message format is changed, thereby making it easy to perform a maintenance operation.

In the view of the above mentioned object, according to the present invention, there is provided an event data processing method for performing editing and saving of a message in accordance with a request from a function program. It is characterized by comprising steps for editing the message by utilizing a JOIN function of a function database that uses a relational database of the function program, for obtaining information for saving the message by referring to an information table in accordance with a saving request from the function program, and for performing saving of the message into a saving area on the basis of the obtained information.

In this method, no program is used to edit a message and the JOIN function of the relational database is used. Consequently, a message format database becomes unnecessary and, even in the case where the message format is changed or a message is added, it is not required to change a program or a database and it is enough that only a JOIN definition file is changed. As a result, there is realized an effect that a maintenance cost is reduced.

Further it's characterized in that, during the editing of the message, if the editing is performed by embedding a computation result into the message, a computation is performed within a definition of a message virtual table generated by joining real tables in the function database by means of the JOIN function of the relational database.

Further, during the editing of the message, if a character string and numerical value to be embedded in the message are changed according to a condition, the character string and the numerical value are changed by a conditional expression within a definition of a message virtual table generated by joining real tables in the function database by means of the JOIN function of the relational database.

Further, during the editing of the message, if a format of the message is changed according to a condition, the message format is changed by a conditional expression within a definition of a virtual table generated by joining real tables in the function database by means of the JOIN function of the relational database.

Further, during the saving of the message, attribute information that is usable for retrieval and filtering of the message is stored along with the message.

In addition, the present invention also includes an event data processing apparatus

BRIEF DESCRIPTION OF THE DRAWINGS

In the accompanying drawings:

FIG. 2 shows a JOIN definition of a message virtual table in accordance with a first embodiment of the present invention;

FIG. 3 shows a JOIN definition of a message virtual table in accordance with a second embodiment of the present invention;

FIG. 4 shows a JOIN definition of a message virtual table in accordance with a third embodiment of the present invention;

FIG. 5 shows a JOIN definition of a message virtual table in accordance with a fourth embodiment of the present invention;

FIG. 6 shows a construction of a saving area of a saving area database in accordance with a fifth embodiment of the present invention; and FIG. 7 shows an example of a construction of a conventional event data processing method of this type.

DETAILED DESCRIPTION OF THE PREFERRED EMBODIMENTS

Figure 1:
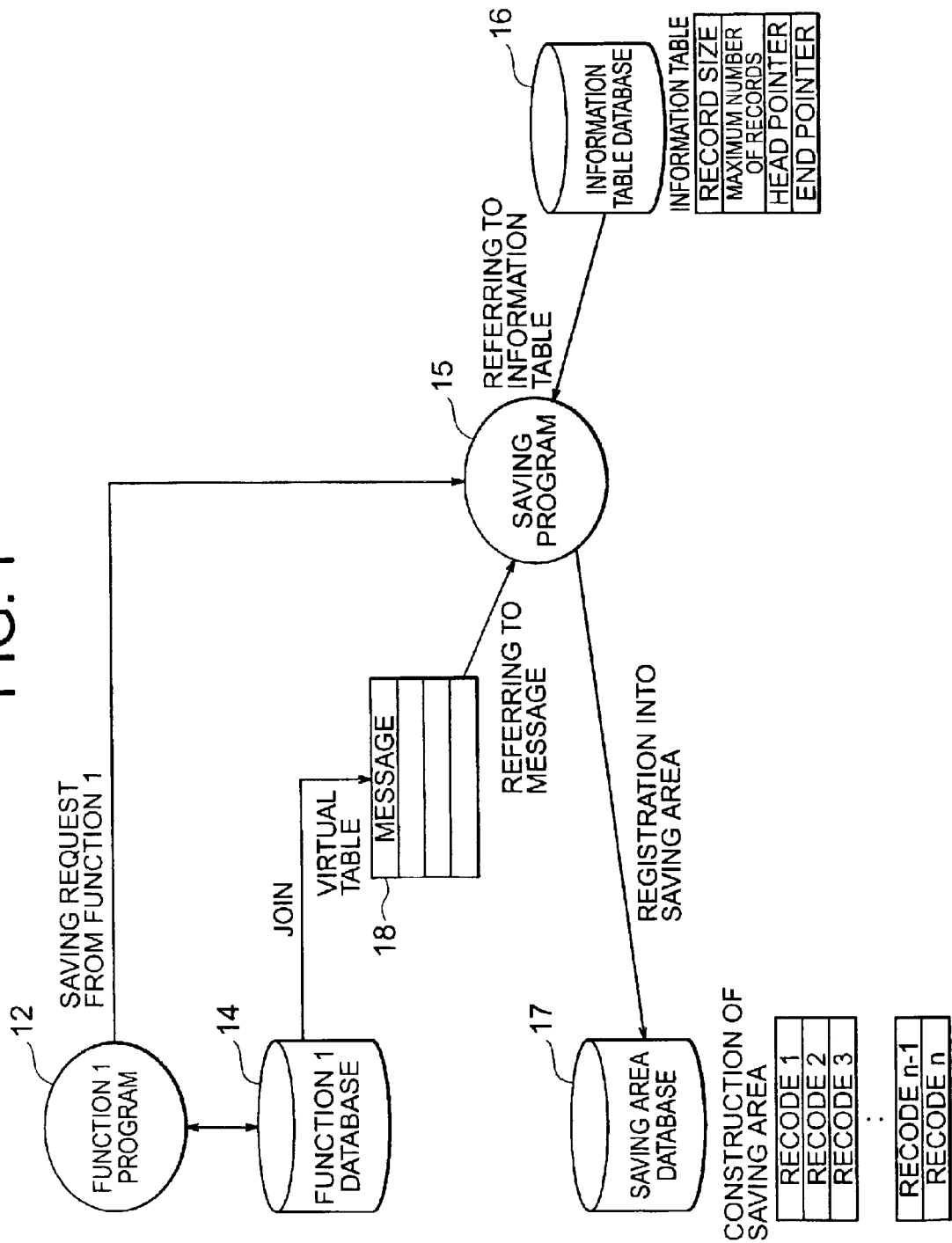
FIG. 1 shows an example of a construction of an event data processing method according to the present invention.

According to a first aspect of the present invention, a relational database is used as a function database, thereby making it possible to edit a message using a JOIN function of the relational database and to allow a message saving program to read the edited message from a virtual table.

According to a second aspect of the present invention, in the case where editing will be performed for a message containing a computation result, the computation is carried out within a definition of a virtual table and a message saving program reads a computation result from the virtual table.

According to a third aspect of the present invention, in the case where which character string and numerical value should be embedded into a message is changed by a condition, it is possible to change the character string and the numerical value within a definition of a virtual table using a conditional expression. A message saving program reads a message obtained after the changing.

According to a fourth aspect of the present invention, in the case where which format should be used for a message is changed by a condition, a message format is changed within a definition of a virtual table using a conditional expression and a message saving program reads a message obtained after the changing.

According to a fifth aspect of the present invention, during the saving of a message, in addition to the message, element data forming the message is also stored along with the message, thereby making it possible to easily perform the retrieval and filtering of the message.

The present invention will be described below with reference to embodiments.

First Embodiment

FIG. 1 shows an example of a construction of an event data processing method according to the present invention. In FIG. 1, reference numeral 12 denotes a function 1 program, numeral 14 denotes a function 1 database, numeral 15 denotes a saving program, numeral 16 denotes an information table database, numeral 17 denotes a saving area database, and numeral 18 denotes a virtual table of each message generated by joining real tables in the function 1 database using the JOIN function of a relational database.

It should be noted here that a computer, in which the saving program 15 is activated, includes means for obtaining information for saving each message in accordance with a saving request from the function program and means for performing the saving of the message, with these means operating in accordance with the saving program.

FIG. 2 shows a JOIN definition of the message virtual table 18 in the first embodiment. In FIG. 2, the entry named "TABLE NAME" gives the name of the virtual table, the entry named "COLUMN NAME" gives the column name of a message, and the entry named "DATA DEFINITION" gives the contents of a data definition of the message column. Here, the legend "% f" represents a variable and shows that a value of the following assignment expression should be assigned thereinto. The entry named "ASSIGNMENT EXPRESSION" gives a variable that should be assigned into a message, while the legend "MEASURED VALUE UPPER LIMIT VALUE" indicates the assignment of a value in the "UPPER LIMIT VALUE" column of the "MEASURED VALUE" table. Here, the format of definition contents of the data definition is changed according to the relational database that is actually used, so that an example thereof is shown in this embodiment.

An operation according to this embodiment will be described below with reference to FIGS. 1 and 2. The saving program 15 receives a message saving request from the program 12 of the function 1. In accordance with this message saving request, the saving program 15 reads a message from the virtual table 18 generated based on the JOIN definition in FIG. 2. As to the JOIN definition in FIG. 2, message contents are edited by the JOIN definition, thereby making it possible to read edited data from the virtual table 18. Next, the saving program 15 obtains information to be saved by referring to an information table (to be described later) of the information table database 16. On the basis of the obtained information, the saving program 15 performs registration into the nth record of the saving area database 17. The information table is composed of information concerning: the size of one record; the maximum number of records; a head pointer; an end pointer; and the like.

As described above, with the technique of this first embodiment, no program is used to edit a message and the JOIN function of the relational database is used. Consequently, a message format database becomes unnecessary and, even in the case where the message format is changed or a message is added, it is not required to change a program or a database and it is enough that only a JOIN definition file is changed. As a result, there is realized an effect that a maintenance cost is reduced.

Second Embodiment

FIG. 3 shows the JOIN definition of the message virtual table 18 in a second embodiment of the present invention. According to the JOIN definition in FIG. 3, columns of a plurality of tables are referred to and an assignment of a computation result can be performed with an assignment expression. In this embodiment, the value of MVA is computed and is assigned to a message as an upper limit value.

An operation according to this embodiment will be described below with reference to FIGS. 1 and 3. The saving program 15 receives a message saving request from the program 12 of the function 1. In accordance with this message saving request, the saving program 15 reads a message from the virtual table 18 generated based on the JOIN definition in FIG. 3. As to the JOIN definition in FIG. 3, it is possible to edit message contents based on the JOIN definition and to read edited data from the virtual table. Next, the saving program 15 obtains information to be saved by referring to an information table (to be described later) of the information table database 16. On the basis of the obtained information, the saving program 15 performs the registration into the nth record of the saving area database 17. The information table is composed of information concerning: the size of one record; the maximum number of records; a head pointer; an end pointer; and the like.

As described above, with the technique of this second embodiment, it is possible to assign a computation result of a computation expression to a message within the JOIN definition. Consequently, it is not required to perform a computation within a program. Thus, it is not required to modify the program and it is enough that only a JOIN definition file is changed even if the computation expression is changed. As a result, there is realized an effect that a maintenance cost is further reduced.

Third Embodiment

FIG. 4 shows the JOIN definition of the message virtual table 18 in a third embodiment of the present invention. According to the JOIN definition in FIG. 4, it is possible to perform a conditional branch using an assignment expression and to change a value to be assigned using a condition. In this embodiment, there is shown a case where if a measured value exceeds an upper limit, a character string "UPPER LIMIT" and a "UPPER LIMIT VALUE" are assigned and, if the measured value is below a lower limit value, a character string "LOWER LIMIT" and a "LOWER LIMIT VALUE" are assigned.

An operation according to this embodiment will be described below with reference to FIGS. 1 and 4. The saving program 15 receives a message saving request from the program 12 of the function 1. In accordance with this message saving request, the saving program 15 reads a message from the virtual table 18 generated based on the JOIN definition in FIG. 4. As to the JOIN definition in FIG. 4, it is possible to edit message contents with the JOIN definition and to read edited data from the virtual table. Next, the saving program 15 obtains information to be saved by referring to an information table (to be described later) of the information table database 16. On the basis of the obtained information, the saving program 15 performs the registration into the nth record of the saving area database 17. The information table is composed of information concerning: the size of one record; the maximum number of records; a head pointer; an end pointer; and the like.

As described above, with the technique of this third embodiment, it is possible to change a value to be assigned in accordance with a condition by performing the conditional branch within the JOIN definition. Consequently, it becomes possible to assign a computation result of a computation expression into a message, so that it is not required to perform the conditional branch within a program. Thus, it is not required to modify the program and it is enough that only a JOIN definition file is modified even if the conditional expression is changed. As a result, there is realized an effect that a maintenance cost is further reduced.

Fourth Embodiment

FIG. 5 shows the JOIN definition of the message virtual table 18 in a fourth embodiment of the present invention. According to the JOIN definition in FIG. 5, it is possible to perform a conditional branch using a data definition and to change a message format using a condition. In this embodiment, there is shown a case where if a format type of a measured value is "1", a Japanese message is outputted and, if the format type is "2", an English message is outputted.

An operation according to this embodiment will be described below with reference to FIGS. 1 and 5. The saving program 15 receives a message saving request from the program 12 of the function 1. In accordance with this message saving request, the saving program 15 reads a message from the virtual table 18 generated based on the JOIN definition in FIG. 5. As to the JOIN definition in FIG. 5, it is possible to edit message contents with the JOIN definition and to read edited data from the virtual table. Next, the saving program 15 obtains information to be saved by referring to an information table (to be described later) of the information table database 16. On the basis of the obtained information, the saving program 15 performs the registration into the nth record of the saving area database 17. The information table is composed of information concerning: the size of one record; the maximum number of records; a head pointer; an end pointer; and the like.

As described above, with the technique of this fourth embodiment, it is possible to change a message format in accordance with a condition within the JOIN definition. Consequently, it is not required to modify a program and it is enough that only a JOIN definition file is modified even if a format is changed. As a result, there is realized an effect that a maintenance cost is further reduced.

Fifth Embodiment

FIG. 6 shows a construction of a saving area of the saving area database 17 in a fifth embodiment of the present invention. In FIG. 6, in addition to a message, it is possible to also register attributes of the message in the saving area. The message attributes are, for instance, a date at which the message is registered, a priority given to the message, and a code number showing the type of a cause of the message.

An operation according to this embodiment will be described below with reference to FIGS. 1, 2, and 6. The saving program 15 receives a message saving request from the program 12 of the function 1. In accordance with this message saving request, the saving program 15 reads a message from the virtual table 18 generated based on the JOIN definition in FIG. 2. According to the JOIN definition in FIG. 2, it is possible to edit message contents with the JOIN definition and to read edited data from the virtual table 18. Next, the saving program 15 obtains information for preserving records shown in FIG. 6 by referring to an information table (to be described later) of the information table database 16. On the basis of the obtained information, the saving program 15 performs the registration into the nth record of the saving area database 17. The information table is composed of information concerning: the size of one record; the maximum number of records; a head pointer; an end pointer; and the like.

As described above, with the technique of this fifth embodiment, in addition to a message, the attribute information accompanying the message is also saved. Consequently, it is possible to use the attribute information for the retrieval and filtering of a message. As a result, when a user browses message contents, it is possible to extract and display only a necessary message.

What is claimed is:

1. An event data processing method for editing and saving a message in accordance with a request from a function program, the event data processing method comprising:

editing the message by utilizing a JOIN function of a function database that uses a relational database of the function program;

obtaining information for saving the message by referring to an information table in accordance with a saving request from the function program; and saving the message into a saving area based on the information obtained.

2. The event data processing method according to claim 1, wherein, during the editing of the message, if the editing is performed by embedding a computation result into the message, a computation is performed within a definition of a message virtual table generated by joining real tables in the function database by the JOIN function of the relational database.

3. The event data processing method according to claim 1, wherein, during the editing of the message, if a character string and a numerical value to be embedded in the message are changed according to a condition, the character string and the numerical value are changed by a conditional expression within a definition of a message virtual table generated by joining real tables in the function database with the JOIN function of the relational database.

4. The event data processing method according to claim 1, wherein, during the editing of the message, if a format of the message is changed according to a condition, the message format is changed by a conditional expression within a definition of a virtual table generated by joining real tables in the function database by means of the JOIN function of the relational database.

5. The event data processing method according to claim 1, wherein, during the saving of the message, attribute information that is usable for retrieval and filtering of the message is saved along with the message.

6. The event data processing method according to claim 2, wherein, during the saving of the message, attribute information that is usable for retrieval and filtering of the message is saved along with the message.

7. The event data processing method according to claim 3, wherein, during the saving of the message, attribute information that is usable for retrieval and filtering of the message is saved along with the message.

8. The event data processing method according to claim 4, wherein, during the saving of the message, attribute information that is usable for retrieval and filtering of the message is saved along with the message.

9. An event data processing apparatus for editing and saving a message in accordance with a request from a function program, the event data processing apparatus comprising:

a function database of the function program constructed from a relational database and editing the message using a JOIN function of the relational database;

an information table database in which information for saving the message is stored;

a saving area database for saving the message;

means for obtaining information for saving the message by referring to the information table database in accordance with a saving request from the function program; and means for saving the message into the saving area database based on the information obtained.

* * * * *